Patented Feb. 15, 1944

2,341,723

UNITED STATES PATENT OFFICE 2,341,723

TREATMENT OF GREEN COFFEE

Daniel Joseph Kennedy, Vancouver, British Columbia, Canada

No Drawing. Application April 30, 1940,
Serial No. 332,499

11 Claims. (Cl. 99—65)

My invention relates to improvements in the treatment of green coffee.

The objects of the invention are to bring all the coffees of a desired blend to a suitable condition of ripeness, so that all the berries will react in a similar manner to the process of roasting and brewing and that the harshness and other undesirable flavours which are normally found in so-called low grade coffees will be eliminated.

The present practice in the coffee industry is to blend different grades of coffee and coffee from different sources together before roasting. Some coffees, according more particularly to the elevation in which they are grown, are more evenly ripened than others and in spite of care in grading and the different processes for culling out unripe berries from the crop the degree of ripeness of the berries of a coffee crop, particularly that grown at altitudes of 2000 feet or less, varies very considerably. Some coffees such as those from Brazil and Kenya which are grown between the 2500 and 6000 feet levels are generally well ripened naturally by the sun's rays which at certain periods of the day are tempered by the cool mists prevalent in such high altitudes. Other coffees from low land sources frequently 3000 feet above sea level or less are of irregular ripeness and that portion of the crop which is commercially deemed to be ripe is to a serious extent actually deficient in light ray treatment and also deficient in subjection during the ripening period to moisture laden vapours.

I have referred in previous patents to coffee treatment to the neutralization of caffeine by subjecting the green berries to ultra violet rays and have over long periods of experimentation found that the subjection of green coffee berries to ultra violet rays mellows the coffee and enhances its cup qualities very materially. Chlorogenic acid, a constituent of coffee, is associated with the caffeine and is directly effected by ultra violet rays.

It is found that the chlorogenic acid content of well ripened or matured high altitude coffee is less than that of many of the lower grades and lower altitude coffees. It is also found that subjection of green berries to ultra violet rays reduces their chlorogenic acid content and that when the so treated berries are roasted the flavour of the coffee is materially improved. The desideratum of chlorogenic acid content of green coffee berries appears to be not more than 7% and that when this amount is exceeded the flavour of the coffee is harsh or otherwise objectionable, such objectionable flavour being substantially proportionate to the increase of said acid content over the 7%.

Experiments have shown that fully matured coffees are materially improved in flavour by subjecting the green berries to ultra violet rays for as short a time as 15 seconds, provided all sides of the said berries are subjected to the rays simultaneously as when the berries are cascaded or thrown into the air. Similar improvement is obtained when the berries are spread out in a thin layer by increasing the length of time that they are being passed under the light to from 2 to 2½ minutes. Prolonged subjection of berries to ultra violet rays after fully ripened or fully matured flavour is obtained does not impair the flavour or so far as I have yet been able to ascertain add further to its flavour characteristics.

My present method of treatment is to take any desired blend of coffee berries which for economical reasons necessarily includes some coffee grown at high altitude and other at medium or low altitude and spread them out by any suitable means into a thin layer, then subject said berries to the rays of an ultra violet lamp from two to six minutes. The preferred time range with general average blends of coffees lies between three and a half and six minutes. However, other times and time ranges may be used, for example in some instances berries may be under the lamp but three and one-half minutes or a time range of three and one-half to five minutes may be used. I further treat the berries to a stream of cold air and admix with said air a minute quantity of steam at atmospheric pressure. The air temperature is such that when tempered with the steam the atmosphere in which the coffee berries are being treated is around 55 to 65 degrees Fahrenheit and preferably not exceeding 70° Fahrenheit. The chemical reaction, caused by introduction of moist air to the coffee during irradiation is not as yet determined, but cup testing of the coffee so treated indicated added flavour characteristics over that treated by ultra violet rays alone. It is, however, believed that the rays are filtered and reflected by the globules of moisture in the mist produced and also that the rays are consequently rendered more penetrating and that the lower altitude coffees are softened thereby, thus improving the ultimate roast.

Roasted and ground coffee made from berries treated as above described appear to increase in aroma and delicious flavour for a month or more after packing in exhausted packages and retain their delicious characteristics for an extended period after opening.

What I claim as my invention is:

1. The method of treating a batch of coffee comprising a mixture of coffee berries from various sources and possessing different qualities, to impart to the resultant product a substantially uniform taste characteristic throughout the batch, the same consisting in intermittently mixing the different lots of berries together and subjecting the same to the influence of ultra-violet rays for a period of approximately six minutes, to reduce any chlorogenic acid to a negligible quantity and irradiate the entire batch to a degree whereby the whole will have equivalent treatment by violet rays and coffee abstracted anywhere from the batch will possess substantially identical taste.

2. The method of treating a batch of coffee comprised of a mixture of coffee berries from different sources, to impart to the resultant product a substantially uniform taste or flavour characteristic throughout the entire batch, the same consisting in bringing together several lots of berries, intermittently mixing the berries from the various lots, and subjecting the intermixture to the influence of ultra-violet rays for approximately five minutes to additionally irradiate the berries that have received substantial treatment by the natural rays of the sun and to treat the relatively less cured berries to a point equal to said additional treatment of said first-mentioned berries, whereby the whole intermixture will ultimately have had equivalent irradiation and coffee abstracted anywhere from the batch will possess substantially identical taste.

3. The method of treating a batch of coffee comprising a mixture of coffee berries of substantially different qualities to impart to the resultant product a substantially uniform taste characteristic throughout the batch, the same consisting in bringing together a lot of berries known to have been substantially exposed to the natural violet rays of the sun and other berries known not to have had similar exposure or for other reasons to be of relatively inferior quality, intimately mixing the two grades of berries, dispersing the mixture to present the same in relatively thin layer formation, and subjecting said layer to the influence of ultra-violet rays for a period of over three and one-half minutes, thereby reducing any chlorogenic acid content to a negligible quantity and irradiating the entire batch to a substantial degree above said natural irradiation of the first-mentioned lot of berries, whereby the whole will have an equivalent treatment by violet rays and coffee abstracted anywhere from the batch will possess substantially identical taste.

4. The method of treating a batch of coffee made up of miscellaneous lots of coffee berries some of which have been subjected to relatively substantial influence of the natural violet rays of the sun and others of which have been grown under relatively less favorable conditions or have become deteriorated, whereby there is imparted thereto a rancid or green taste, the same consisting in intermixing the berries of said various qualities and subjecting the entire mixture to the influence of ultra-violet rays for a period sufficiently long to cure all of the berries throughout the whole batch for a period of over three and one-half minutes.

5. The method of treating a batch of green coffee which comprises spreading it out in relatively thin formation and subjecting it to ultra-violet rays until the chlorogenic acid content of coffee taken from any part of the batch does not exceed 7 per cent.

6. The method of treating a batch of green coffee berries which comprises treating said coffee berries with ultra-violet rays for a period of over two minutes in a moist atmosphere.

7. The method of treating a batch of green coffee berries which comprises treating said coffee berries with ultra-violet rays in a moist atmosphere until the chlorogenic acid content of the treated coffee taken from any place in the batch does not exceed 7 per cent.

8. The method of treating a batch of green coffee berries which consists of treating said coffee berries in a moist atmosphere at a temperature of not exceeding 70 degrees Fahrenheit and subjecting said berries to ultra-violet rays for a period of over two minutes.

9. The method of treating a mixture of green coffee berries characterized in that portions of the berries have received greater irradiation from the natural rays of the sun than other portions to impart to the resultant product a substantially improved taste-flavor characteristic when roasted and prepared as a coffee beverage by subjecting the mixture to the influence of ultra-violet rays until all portions of the mixture shall have received additional irradiation to render substantially equal the degree of irradiation of all portions of the mixture.

10. The method of treating a batch of green coffee berries which comprises subjecting said berries to ultra-violet rays for a period of over two minutes in a moist atmosphere formed by introducing low pressure steam to the air in the treating zone and maintaining the moisture laden atmosphere so formed at 55 to 65 degrees Fahrenheit.

11. The method of treating a mixture of green coffee berries characterized in that portions of the berries have received greater irradiation from the natural rays of the sun than other portions to impart to the resultant product a substantially improved taste-flavor characteristic when roasted and prepared as a coffee beverage comprising spreading the said green berries in relatively thin layer formation and subjecting the said green berries so distributed to the influence of ultra-violet rays for a period of over two minutes.

DANIEL JOSEPH KENNEDY.